United States Patent [19]

Malinowski

[11] Patent Number: 4,888,741
[45] Date of Patent: Dec. 19, 1989

[54] MEMORY WITH CACHE REGISTER INTERFACE STRUCTURE

[75] Inventor: Christopher W. Malinowski, Melbourne Beach, Fla.

[73] Assignee: Harris Corporation, Melbourne, Fla.

[21] Appl. No.: 289,748

[22] Filed: Dec. 27, 1988

[51] Int. Cl.⁴ .............................................. G11C 13/00
[52] U.S. Cl. .................................. 365/230.05; 365/49; 365/221
[58] Field of Search ............. 365/49, 219, 221, 230.05

[56] References Cited

U.S. PATENT DOCUMENTS 4,796,232  1/1989  Horse ............................ 365/230.05

Primary Examiner—Terrell W. Fears
Attorney, Agent, or Firm—Barnes & Thornburg

[57] ABSTRACT

A memory having at least a pair of cache registers between the data input and output ports and the read and write ports of a memory matrix and controls to alternate the interconnection between the cache registers and the data input/output ports and the read/write terminals of the memory matrix, such that while one cache register is connected to the data input/output port, the other cache register is connected to a port of the memory. Look-ahead logic is provided to generate the next address of the memory location which is to be written into or read from with simultaneous transfer of information to or from the cache register which is connected to the memory ports.

16 Claims, 3 Drawing Sheets

MEMORY WITH CACHE REGISTER INTERFACE STRUCTURE

SUMMARY OF THE INVENTION

The present invention relates generally to memories and more specifically to the use of cache registers as interface structures for memories.

A cache memory or register is a small, high speed memory which contain a copy of selected blocks of a main memory. These blocks are chosen in an attempt to predict which portion of the main memory will be needed in the near future and hopefully the next cycle.

Sequential memories are memories which have a read port and a write port through which data is written and read in sequence. In a first-in-first-out (FIFO) memory, the data is written sequentially at increasing addresses from the highest occupied or last written address and read sequentially at addresses increasing from the lowest occupied or last read address. In the last-in-first-out (LIFO) memory, data is written at sequentially higher addresses from the last written address, and read sequentially from the last highest read address to lower addresses. These are distinguished from non-sequential memories or random access memories (RAM) wherein any address within the memory array may be written into or read from selectively.

Similarly to other memory architectures, operational cycle of FIFO and LIFO memories can roughly be divided into three stages: generating an address for the data to be read or written into the memory array, decoding the address into the format suitable for activation of corresponding rows and columns of the memory elements (column/row decode), and finally writing the data into, or reading them from the selected memory cells. Thus, the total time required to complete the READ/WRITE cycle is dictated by the combined times of performing these three consecutive operations. For most process technologies, the amount of time required to perform the first two operations is roughly equal to the amount of time necessary to actually read from or write into the selected memory array cells. However, current FIFO and LIFO perform all these operations in a consecutive fashion, i.e. they accept at their inputs a READ or WRITE signal (and data in the latter case), increment or decrement the previous memory address, decode it into the column/row format, activate the selected row of memory cells and finally read or write the desired data.

Thus, it is an object of the present invention to provide an improved interface structure for memories.

Another object of the present invention is to provide an interface structure for memories which does not increase the access time of the memories.

These and other objects are achieved by providing at least a pair of cache registers between the data input and output ports and the read and write ports of the memory and controls to alternate the interconnection between the cache registers and the data input and output ports and the read and write ports of the memory, such that while one cache register is connected to the data input or output port, the other cache register is connected to a write or read port of the memory array, respectively. Look-ahead logic is provided to generate the next address of the memory location which is to be written into or read from with simultaneous transfer of information to or from the cache register which is connected to the memory ports.

The cache register interface increases level of parrallelism of the operations described above. Due to the sequential nature of data accessing in the case of LIFO and FIFO memories, it is possible to generate all possible addresses of the next cycle instruction, while performing current data READ/WRITE operation. Thus the total READ/WRITE cycle time is reduce to the amount of time required to do either a memory array access, or next address generation and column/row decode, whichever is greater. Such an arrangement thus offers cycle time savings up to 50% over currently used designs.

In a FIFO memory, there are two pairs of cache registers, one pair connected between the data input port and the memory write port and another pair being connected between the data out port and the memory read port. A pair of look-ahead logics generates and selects the next address to be read on the read port and the next address to be written on the write port. These next addresses are determined simultaneously with the transfer of data to and from the memory array. A flag store stores a flag indicating the occupied or unoccupied status of each memory location in the memory. A memory status logic monitors the flag store and provides an empty or a full flag when the memory is empty or full, respectively. The empty flag is set when a read operation is attempted at a location having an unoccupied flag, and a full flag is set when a write operation is attempted at a memory location having an occupied flag.

For a LIFO memory, only a single pair of cache registers need be provided. The control logic connects one of the cache registers to the data port while the other cache register is connected to either the read or write port of the memory depending upon whether it is a read or write operation. Look-ahead logic includes generating the present memory location address, the preceding location address and the subsequent location address. Address select logic selects one of these three addresses as the next address, depending upon the sequence of read and write operations. For alternating read and write operations, the present address is selected; for a read-read operation sequence, the preceding address is selected; and for a write-write operation sequence, the subsequent address is selected.

The technique used for a LIFO memory may also be used in a random access memory. Using a set of cache registers and a consecutive address register as in the LIFO memory, speed advantage can be obtained for sequential reads and writes and for all writers from and into the RAM array.

Other objects, advantages and novel features of the present invention will become apparent from the following detailed description of the invention when considered in conjunction with the accompanying drawings.

DETAILED DESCRIPTION OF THE DRAWINGS

The concept of the present invention is to provide an input structure between the data input and output ports and the memory array read and write ports which includes at least two registers which are alternately connected such that one is connected to the data input or output port and the other is connected to the read or write port of the memory, and this connection is alternated depending upon the sequence of read and write operation commands. The concept will be described with respect to FIFO and LIFO sequential memories, but is also applicable to RAMs.

Figure 1:
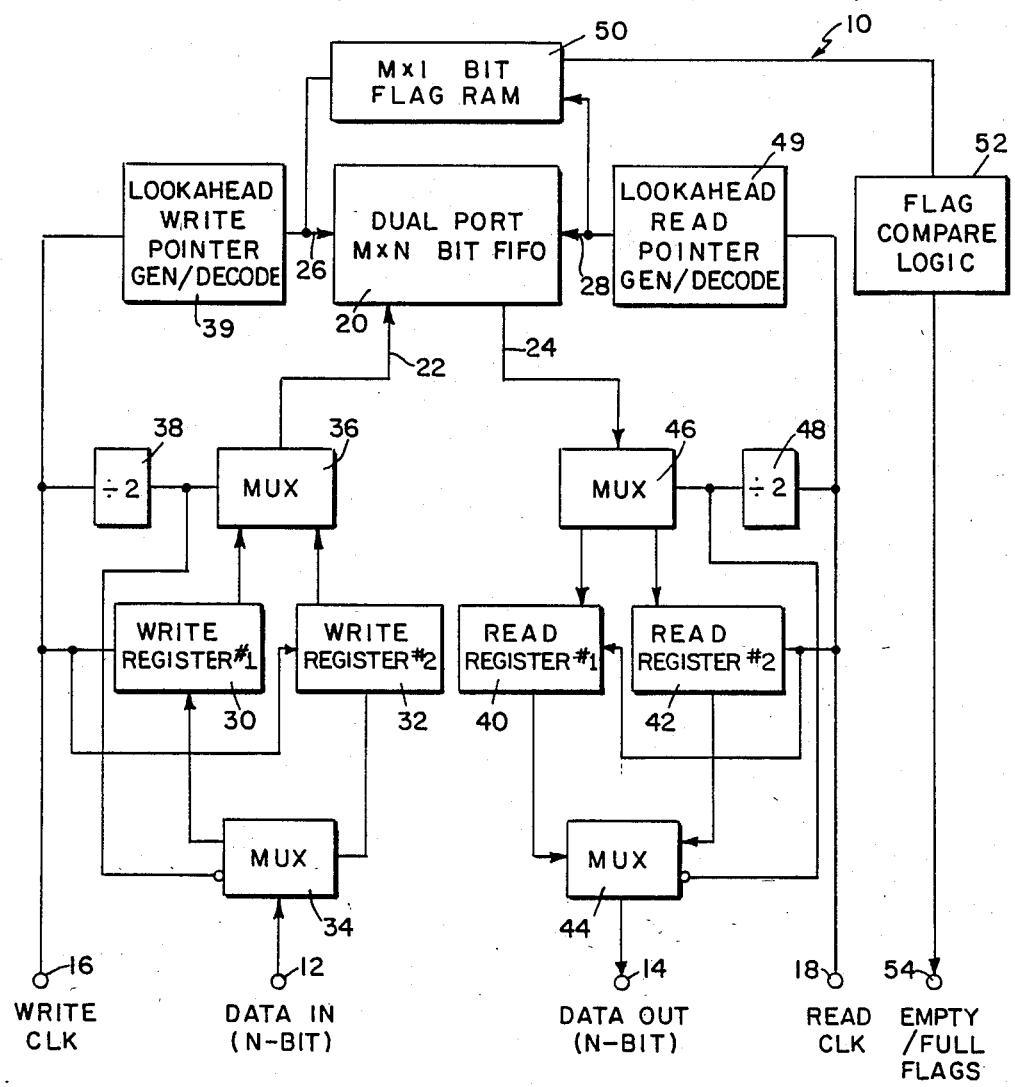
FIG. 1 is a block diagram of a FIFO memory incorporating the principles of the present invention.

As illustrated in FIG. 1, a FIFO memory 10 includes data input port 12, data output port 14, write clock port 16 and read clock port 18. A dual port M-word/N-bit wide memory 20 includes a write port 22, a write address port 26, a read port 24 and a read address port 28. The interface structure on the data in/write side of the memory includes write cache registers 30 and 32 having their input terminals connected by data multiplexer 34 to the data input port 12. The outputs of the write registers 30, 32 are connected through a memory multiplexer 36 to the write port 22 of memory 20.

A divide-by-two counter 38 controls the alternation of the data multiplexer 34 and memory multiplexer 36 and is responsive to the write operation commands or clock on write port 16. The signal from divide-by-two counter 38 is connected directly to memory multiplexer 36 and the inversely to data multiplexer 34 such that one of the write registers 30, 32 is connected by data multiplexer 34 to the data input port 12, while the output of the other write register 30, 32 is connected through memory multiplexer 36 to the write port 22 of memory 20. The multiplexers 34, 36 have one state which is changed to the second state on every other cycle of the write clock by counter 38.

A look-ahead write pointer generator 39 determines the address of the next location in memory array 20 in which the data is to be written and is connected to column/row write address port 26 of memory 20. The look-ahead write pointer generator 39 calculates and decodes to column/row format the next address during the transfer of the data from the write registers 30, 32 to the write port 22 of the memory 20. Since memory 10 is a FIFO memory, the next write address, calculated by look-ahead write pointer generator 39, is the next highest address from the previously written address.

The read interface structure includes read registers 40, 42, having their outputs connected to the data output terminal 14 by data memory multiplexer 44. The read port 24 of the memory 20 is connected through multiplexer 46 to the input terminals of read registers 40, 42. A divide-by-two counter 48, responsive to the read operation commands from read clock terminal 18, is connected to memory multiplexer 46 and the inverse is connected to data multiplexer 44 to alternate the connection of the read registers 40, 42. The signal from divide-by-two counter 48 operates every other read operation command such that the multiplexers 44, 46 change states every read operation command. A look-ahead read pointer generator 49 generates the next address in the column/row format of the memory array location in memory array 20 which is to be read and is connected to read address port 28 of memory 20. Since the memory array 10 is a FIFO memory, the look-ahead read pointer generator 49 generates the address next higher beginning with the lowest previously read address location.

The use of a dual port memory 20 and separate pairs of registers and look-ahead logic for the read and write ports allows asynchronous operation of the read and write segments. The use of the pairs of write and read cache registers 30, 32, 40, 42 allows significant acceleration of memory access/cycle times. The theoretical cycle time of the total memory 10 with the registers becomes potentially equal to the on-chip memory array access time and no longer includes the overhead related to the address generation and decoding time and the I/O buffer delays. The system writes information into one register while the other register is writing into memory array, or on the read side, one of the registers is being read to the data output while information from the memory array is being read to the other register. Simultaneously, the address pointer generator is calculating and decoding to the column/row format the next address location. In the next cycle, the roles of the registers are swapped and the new input and output data is overwritten in the register replacing the data from two cycles ago which is in the register.

The memory array 10 also provides the ability of indicating the full/empty status of the memory. A storage 50, which may be a RAM, has $M+1$ flag bits therein. Every write operation sets the flag bit for the corresponding write address to 1, while every read operation sets the flag bit for the corresponding read address to 0. Consequently, whenever a read operation is attempted at a location with a flag bit equal to 0 or unoccupied, the flag compare logic 52 generates an empty flag at full/empty port 54. Similarly, whenever a write operation is attempted to a memory location with a flag bit equal to 1 or occupied, a memory full flag is set by flag comparing logic 52 at port 54. Since the address of both occupied/unoccupied flag bits are known one cycle before the read or write operation, the flag compare logic 52 may also generate an almost empty and almost full flag. Additionally, an up/down counter may be provided to provide a half-full flag capability.

The FIFO memory array 10 may be constructed such that the data entered on the input is automatically shifted to the output. The flag storage 50 is like a shift register following the movement of the data word from the input to the output data location. When a word is read from the output, the remaining words and corresponding flags are shifted toward the output. Thus only the input flag need be monitored for determining a memory full status and only the output flag need be monitored for determining a memory empty status.

The memory 10 of FIG. 1 can also be operated as a LIFO memory wherein the look-ahead read pointer generator 49 would generate a next address which is lower than the previous highest occupied memory location. No other modification is required of memory array 10.

Figure 2:
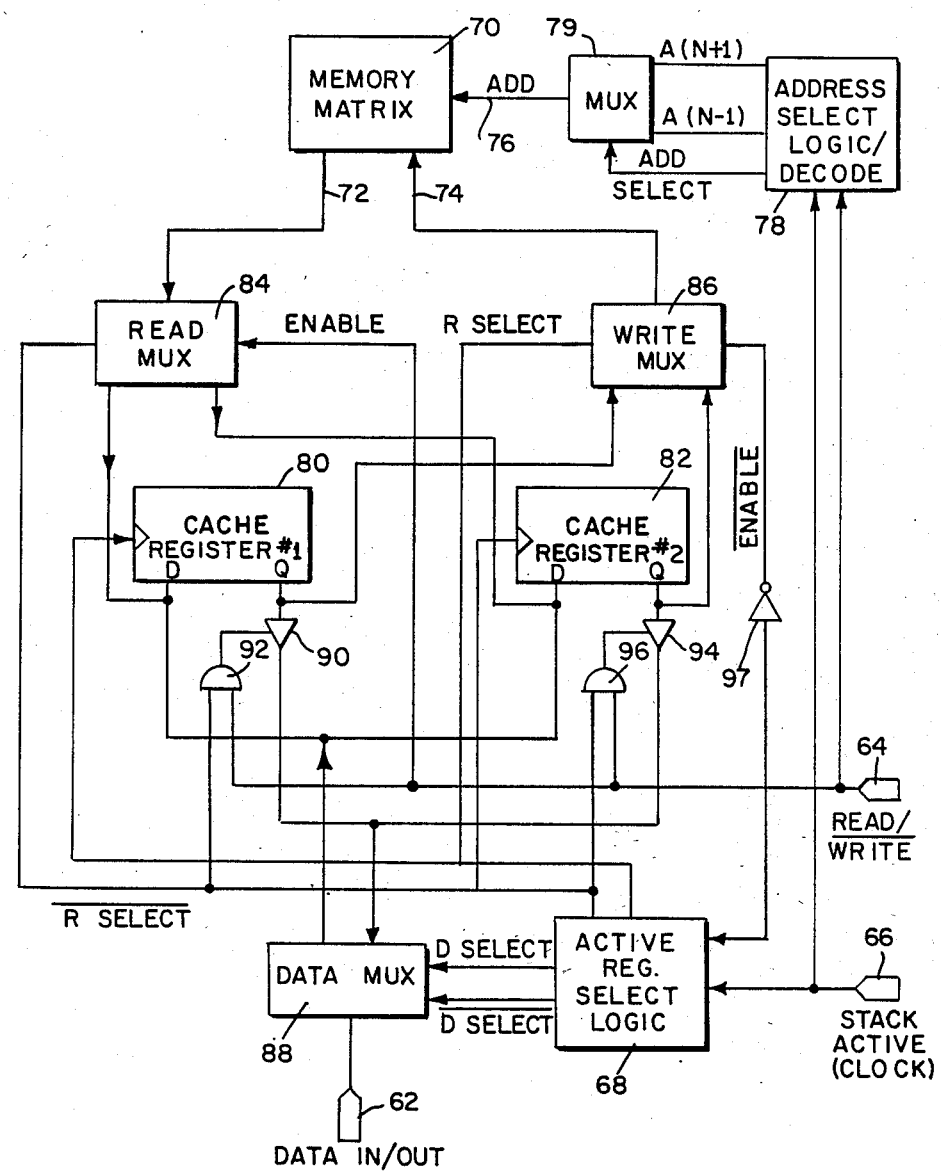
FIG. 2 is a block diagram of a LIFO memory incorporating the principles of the present invention.

Another application of the present invention to a LIFO memory 60 is illustrated in FIG. 2. It includes a data input/output port 62, a read/write command port 64 and a stack active or enable clock port 66. A memory array 70 is provided having a read port 72, a write port 74 and an address port 76. A pair of cache registers 80, 82 have their input ports D connected to the read port 72 of the memory 70 by a read multiplexer 84 and their output or Q terminals connected to the write port 74 of the memory array 70 by write multiplexer 86. The input terminals of cache memories 80, 82 are also connected to the data input and output port 62 by a bidirectional data multiplexer 88. The output terminals Q of cache registers 80, 82 are also connected through gates 90, 94, respectively, to the data input/ouput port 62 by bidirectional multiplexer 88. AND gates 92 and 96 control gates 90 and 94 to select which gate is activated. The deactivated gate 90, 94 is tri-stated or high impedance to isolate the input/output data part 62 from the cache register whose contents are changing.

An active register select logic 68 receives signals from the status active port 66 and the read/write command port 64 to generate a R select and $\overline{R}$ select signal to the multiplexers 84, 86 and D select and $\overline{D}$ select to the multiplexer 88 to select the appropriate interconnection of the cache registers 80, 82 to the read and write ports in 74 of memory 70 and the 15 data input/output port 62. The R select and $\overline{R}$ select signal are also used to drive the clock terminals of the cache registers 80, 82 respectively and as one input to the AND gates 96 and 92 respectively to control the gates 90 and 94. The read/write signal on port 64 is also provided to enable the read multiplexer 84 and the inverse of the signal to enable the write multiplexer 86 through inverter 97. The read/write signal is also provided as the second input to AND gates 92 and 96.

Figure 3:
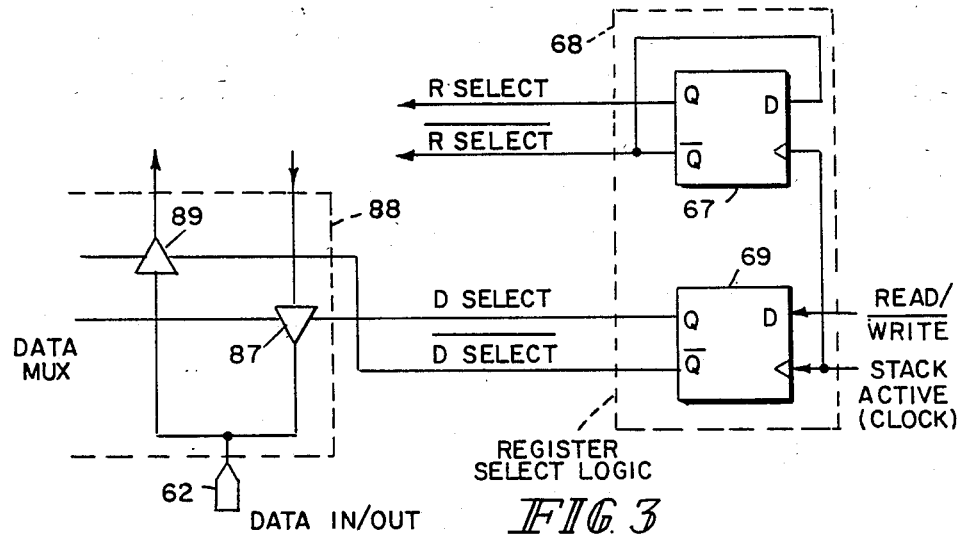
FIG. 3 is a block diagram of the Active Register Select Logic and one bit of the data multiplier.

The details of the active register select logic 68 is shown in FIG. 3. A first flip flop 69 receives the read/write signal on its data terminal and the stack active signal on its clock terminal and provides the D select and $\overline{D}$ select signal on its Q and $\overline{Q}$ outputs to the gate 87 and 89 of the bidirectional data multiplexer 88. Only one bit of the data multiplexer 88 is shown. For a read operation, D select is high and gates 89 are activated transmitting data to input/output port 62 from the memory. For write operations $\overline{D}$ select is high and gates 89 are activated transmitting data from the input/output port 66 to the memory. Flip flop 69 functions as a latch to prevent bus crash due to a synchronous arrival of read/write signals. A second flip/flop 67 has its clock terminal connected to the stack active signal and it data terminal connected to its $\overline{Q}$ output to provide alternating high signals R select and $\overline{R}$ select on its Q and $\overline{Q}$ terminals respectives for each stack active signal. The flip-flop 67 acts as a divide-by-two device and synchronizes the R select and $\overline{R}$ select signals with the stack active signal.

A look-ahead logic determines the appropriate address of information being read from or written into the memory 70, and includes an address select logic and row/column decoder 78 which generates a present address A(N), a preceding address A(N−1), and a subsequent address A(N+1). The preceding address A(N−1) and subsequent address A(N+1) are provided to a multiplexer 79 whose output is connected to the address input 76 of the memory array 70. The address select logic 78 selects and decodes to column/row format one of these three addresses as the next memory location to be selected depending upon the sequence of the read and write operation commands using address multiplexer 79. As will be explained more fully below, if the read and write commands alternate, then the present address A(N) will be the present and the next address. If two read commands appear in sequence, the address of the next or second command will be the preceding address A(N−1), since it is a LIFO memory. If two write commands appear in sequence, then the address for the next or second command will be the subsequent address A(N+1).

Figure 4:
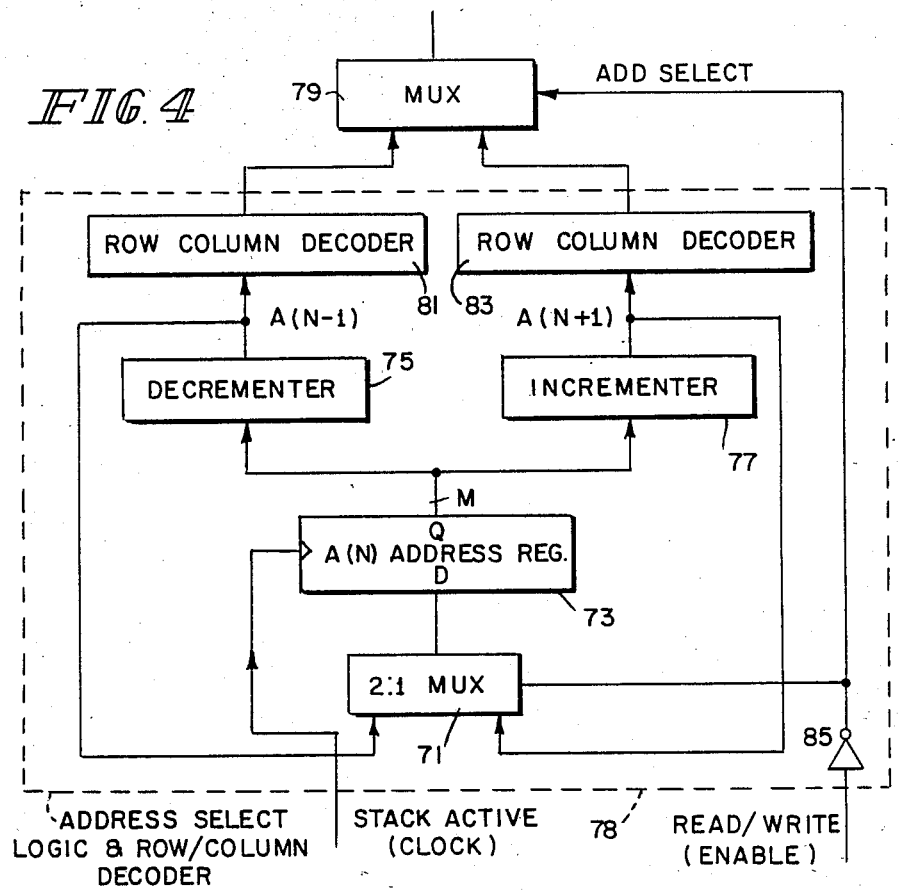
FIG. 4 is a block diagram of Address Select Logic and Decoder.

The address select logic and decode 78, as illustrated in FIG. 4, include a present address A(N) register 73, whose output is connected to decrementer 75 and incrementer 77 which produce a preceding address A(N−1) and subsequent address A(N+1) respectively. These two address A(N−1) and A(N+1) are connected to a multiplexer 71 which selects which address is provided as an input to the present address register 73. These two addresses A(N−1) and A(N+1) are also provided to the address select multiplexer 79 via row/column decoders 81, 83. The stack activate signal is provided on the clock terminal of present address register 73 and the read/write signal is provided through inverter 85 to the multiplexers 71 and 79. For purposes of illustration, assume the present address A(N) is "3" in register 73, then A(N−1) is "2" in decrementer 75 and A(N+1) is "4" in incrementer 77. For a write operation, multiplexer 79 selects "4" as the memory array address and multiplexer 71 selects "4" as the data input for the present address register 73. Now A(N)=4, A(N−1)=3 and A(N+1)=5. For a read operation, the multiplexers 71 and 79 select the A(N−1) address for the present address register 73 and memory array 70.

For a write operation, the active register select logic 68 selects, by $\overline{D}$ select, a path in data multiplexer 88 through activated gate 89 to the data input of cache registers 80 and 82. Although the data is provided to inputs of both cache register 80 and 82, only the cache register 80 is activated by the R select signal on its clock terminal. The write signal on port 64 also activates write multiplexer 86 and deactivates read multiplexer 84. The active register select logic 68 by R select signal also causes the write multiplexer 86 to connect the data output of the cache register 82 to the write port 74 of the memory array 70. Thus, for a single write command, the data from the data input 62 is provided in one cache register 80 and the contents of the second cache register 82 are written into the memory array 70. The address selected will be considered the present address A(N).

If the next operational command is another write, the flip flop 69 of current register select logic 68 does not switches the connection of the data multiplexer 88, but the flip flop 67 by $\overline{R}$ select signal switch the connection of the write multiplexer 86 such that the second cache register 82 the data from input/output port 62 clock in and its output Q is connected through the write multiplexer 86 to the write input 74 of the memory array 70. In that this is a second write command in a row, the address select logic 78 selects via multiplexer 79 the subsequent decoded address A(N+1) as the address of the memory array 70. Since the subsequent address A(N+1) was previously calculated and decoded, there is no time delay in calculating and decoding the appropriate address and merely a logic select is required. With the selection of the subsequent address A(N+1) the address select logic 78 takes this address and makes it the present address A(N) and calculates and decodes a new subsequent address A(N+1) and preceding address A(N−1) such that they are available for the next operational cycle.

If the third cycle is a read cycle, flip flop 69 provided D select signal to deactivate gates 89 and activate gates 87. The flip flop 67 toggels providing R select as an output. This R select signal and read signal on AND gate 96, activates gate 94 to provide the Q output of the cache register 82 to the input/output port 62 through data multiplexer 88. Thus active register select logic 68 does not change its selection of the cache register 82 as the active register, which was previously connected to the data port 62 and is still connected through its output terminal Q and gate 94. Similarly, the cache register 80, which was previously connected to the memory array 70 via its output Q, now has its input D connected to the read port 72 of the memory array 70 through read multiplexer 84. The R select signal clocks the memory data into cache register 80. The enable signal from the read/write port 64 disables the write multiplexer 86 and enables the read multiplexer 84. The address of the memory location which is being read from the matrix 70 to the cache register 80 is the present address A(N) which represents the contents of the cache register 80 which was transferred to the memory array 70 during the previous write cycle.

If a write cycle follows the read cycle, the cache registers 80, 82 will assume their connection of the previous write cycle, namely the input of the cache register 82 will be received from the data input output port 62 while the output of cache register 80 will be connected through write multiplexer 86 to the write port 74 of memory array 70. As long as the read and write cycles alternate, the current register will remain as the cache register 82, connected to the data input/output port 62 while the cache register 80 will be continuously connected to either the write or read ports of memory 70 and the present and next addresses will be the present address A(N).

If a first read operation has the cache register 82 connected through data multiplexer 88 to the data input/output port 62 and the memory 70 connected through read multiplexer 84 to the cache register 80, and the next command is another read, the current register select logic 68 disconnects the cache register 82 from the data input/output port 62 and connects the cache register 80 thereto through data multiplexer 88 and disconnects the read port 72 of memory array 70 from the input of the cache register 80 and connects it to the input of the cache register 82 by changing the connection through read multiplexer 84. Since this is the second read command in sequence, the address select logic 78 selects through multiplexer 79 the preceding address A(N−1) as the input on address port 76 of the memory array 70. Simultaneously, it takes the A(N−1) address and makes it the present address A(N) and calculates and decodes a new preceding address A(N−1) and a new subsequent address A(N+1).

Thus it can be seen for every read cycle, information from the memory array 70 is read into one of the cache registers 80, 82 while the data in the other cache register is provided on the data input/output port 62. And for every write cycle, information is written into one of the cache registers 80, 82 from the data input/output port 62, while information from the other cache register is written into the memory array 70.

Although the R select and R̄ select signal alternate or toggle for each cycle and thus data is clocked into different cache registers each cycle, the connection of the cache registers to the memory array 70 and the input/output data port 62 is a function of the read/write cycle sequences. The appropriate connection of the R select and R̄ select signals to the clock terminal of the cache registers 80, 82, to the control terminals of multiplexers 84, 86 and to the output gates 90, 94 via AND gates 92, 96 provide the appropriate connection for the read/write sequence.

If it is desired, during a read cycle, the write multiplexer 86 may be activated such that the data at the cache register 80, 82 which is connected to the data input/output port 62 is also connected to the memory array 70 such that the data being provided at the data input/output port 62 is also written back into the memory array 70. This would require a dual ported memory array 70 having independent read and write operations and modified select logic for write multiplexer 86.

It should also be noted that the bidirectional data input/output multiplexer 88 and the gates 90, 92, 94, 96 may be replaced by a single four-to-one bidirectional multiplexer connecting the inputs and outputs of the cache registers 80, 82 to the single data input/output port 62.

It is also conceivable that a similar technique be employed in the case of Random Access Memories, although with lesser speed advantage. A RAM equipped with a set of cache registers and a consecutive address generator similar to that shown in FIG. 2 could provide a speed advantage whenever sequential READs, or all WRITEs from/to the RAM array were performed. Extra address comparators would compare externally applied address with the addresses generated internally and if a "hit" were indicated one of the desired READ/WRITE functions would be performed. In the case of out-of-sequence READ (a "miss"), an extra WAIT state signal would go HIGH to indicate to the processor that an extra clock cycle will have to be wasted to decode the out-of-sequence address and get the data. In the case of all WRITEs, however, both data and address would be "cached" (miss or not) for the next cycle memory array writes. Thus, the potential 50% speed-up would be possible for all WRITE operations and all consecutive READ operations.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A memory comprising:
   a data input port and a data output port;
   first and second write registers;
   first and second read registers;
   memory means having write, read and address ports;
   write control means for alternating connection of said first and second write registers between being connected respectively to said data input port and write ports and being connected respectively to said write and data input ports, in response to write operation commands;
   read control means for alternating connection of said first and second read registers between being connected respectively to said data output and read ports and being connected respectively to said read and data output ports, in response to read operation commands.

2. A memory according to claim 1, including:
   write look-ahead means connected to said address port for generating an address of the next write location in said memory means during data transfer from said write registers to said memory means; and
   read look-ahead means connected to said address port for generating an address of the next read location in said memory means during data transfer from said memory means to said read registers.

3. A memory according to claim 2, including:
flag storage means for storing a flag indicating an occupied or unoccupied status of each memory location in said memory means; and
memory status means for monitoring said flag storage means and providing an empty or full flag when said memory means is empty or full, respectively.

4. A memory according to claim 3, wherein memory status means includes:
means for setting an empty flag when a read operation is attempted at a memory location having an unoccupied flag; and
means for setting a full flag when a write operation is attempted at a memory location having an occupied flag.

5. A memory according to claim 2, wherein said memory is an FIFO memory, and said write look-ahead means generates an address of a next memory location higher than the previously highest occupied memory location, and said read look-ahead means generates an address of the next memory location higher than the previously lowest occupied memory location.

6. A memory according to claim 2, wherein said memory is an LIFO memory, said write look-ahead means generates an address of a next memory location higher than the previously highest occupied memory location, and said read look-ahead generates an address of the next memory location lower than the previously highest occupied memory location.

7. A memory according to claim 1, wherein said memory is a LIFO memory, said first read registers and said first write registers are a common first read/write register, said second read register and said second write register are a common second read/write register and said read and write control means alternately connects said first and second read/write registers to said data input and output ports and said write and read ports.

8. A memory according to claim 7, including:
look-ahead means connected to said address port for generating a present address of a memory location, a preceding address of a memory location next lower than said present address and a subsequent address of a memory location next higher than said present address; and
selection means for selecting an address generated by said look-ahead means as a function of a sequence of read and write operation commands.

9. A memory according to claim 8, wherein said selection means selects said present address for an alternating sequence of read and write operation commands, selects said preceding address for consecutive read operation commands, and selects said subsequent address for consecutive write operation commands.

10. A memory comprising:
a data port;
first and second registers;
memory means having write, read and address ports; and control means for alternating connection of said first and second registers between being connected respectively to said data port and said write port and being connected respectively to said write port and said data port for successive write operation commands; and for alternating connection of said first and second registers between being connected respectively to said data port and said read port and being connected respectively to said read port and said data port for successive read operation commands.

11. A memory according to claim 10, including:
look-ahead means connected to said address port for generating a present address of a memory location, a preceding address of a memory location next lower than said present address and a subsequent address of a memory location next higher than said present address; and
selection means for selecting an address generated by said look-ahead means as a function of a sequence of read and write operation commands.

12. A memory according to claim 11, wherein said selection means selects said present address for an alternating sequence read and write operation commands, selects said preceding address for consecutive read operation commands, and selects said subsequent address for consecutive write operation commands.

13. A memory according to claim 10:
wherein said first and second registers include input and output terminals;
including write multiplexer means selectively connecting said write port to said first and second registers output terminals;
including read multiplexer means selectively connecting said read port to said first and second registers' input terminals,
including data multiplexer means selectively connecting said first and second registers input and output terminals to said data port; and
wherein said control means controls said multiplexers.

14. A memory according to claim 13, wherein said control means controls said write and read multiplexer means to connect the output terminal of said first or second register which is connected to said data port also to said write port during a read operation.

15. A memory according to claim 13, wherein said data multiplexer means includes:
bidirectional gate means for connecting said first and second registers' input terminals to said data port during a write operation and for connecting said first and second registers output terminals to said data port during a read operation; and
unidirectional means for connecting only one said first and second registers output terminals to said bidirectional gate means during a read operation.

16. A memory according to claim 15, wherein said control means includes clock means for alternately activating the clock terminals of said first and second registers.

* * * * *